United States Patent [19]

Schoenberg et al.

[11] 3,970,724

[45] July 20, 1976

[54] PROCESSING METHOD FOR SYNTHETIC RUBBERS

[75] Inventors: Emanuel Schoenberg, Brimfield; Thomas L. Hanlon, Akron, both of Ohio

[73] Assignee: The Goodyear Tire & Rubber Company, Akron, Ohio

[22] Filed: Sept. 27, 1973

[21] Appl. No.: 401,317

[52] U.S. Cl. .............................. 260/894; 260/879; 526/66; 526/79; 526/86; 526/335
[51] Int. Cl.$^2$ ............................................ C08L 9/00
[58] Field of Search ............. 260/94.7 A, 894, 94.3, 260/879

[56] References Cited
UNITED STATES PATENTS

| | | | |
|---|---|---|---|
| 3,086,000 | 4/1963 | Wargotz | 260/94.3 |
| 3,335,041 | 8/1967 | Osborne | 260/894 |
| 3,489,823 | 1/1970 | Naarmann et al. | 260/879 |

*Primary Examiner*—J. Ziegler
*Attorney, Agent, or Firm*—F. W. Brunner; J. Y. Clowney; R. A. Thompson

[57] ABSTRACT

A method of preparing synthetic rubbers having improved green strength and improved processing characteristics wherein a portion of the monomer is contacted with a catalyst imparting a cis-1,4 configuration and subsequently contacting the remaining portion of the monomer with a catalyst capable of imparting a trans-1,4 configuration.

2 Claims, No Drawings

PROCESSING METHOD FOR SYNTHETIC RUBBERS

This invention is directed to a process which produces synthetic rubbers having improved processing characteristics and improved unvulcanized properties.

It is known that isoprene can be polymerized to form synthetic rubber of variable structure. The best known and commerically most important is a polyisoprene of high cis-1,4 structure. This polyisoprene resembles natural rubber in most of its properties and has found wide industrial application in areas where natural rubber is used. However, it has been found that the presently known synthetic high cis-1,4-polyisoprenes have some deficiencies when compared to natural rubber. For instance, natural rubber is well known to have excellent "green strength". Green strength is the property wherein unvulcanized but compounded rubber has sufficient tenacity that it can be handled without the tendency to rupture or tear when being utilized to build or to fabricate rubber articles, such as tires and the like. On the other hand, high cis-1,4-polyisoprene which is being produced in large quantities at this time, does not have sufficient green strength to make it quite as versatile as natural rubber. For instance, unvulcanized compounded synthetic high cis-1,4-polyisoprene does have a tendency to tear or rupture while being handled in building tires. The same holds true for cis-1,4-poly-2-ethyl-1,3-butadiene.

Thus, it is the object of this invention to provide a synthetic polyisoprene or poly-2-ethylbutadiene which has sufficient tenacity or green strength to allow these polydienes to be handled in a manner very similar to natural rubber.

More specifically, a preferred objective is to provide a modified synthetic high cis-1,4-polyisoprene which retains the excellent properties associated with cis-1,4-polyisoprene as well as possessing the desired green strength found in natural rubber.

According to the invention it has been discovered that monomers conforming to the structural formula:

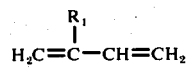

wherein $R_1$ may be an alkyl group containing from 1 to 2 carbon atoms, can be polymerized in a two-step reaction by contacting said monomers with an aluminum-titanium catalyst, wherein said mole ratio of aluminum/titanium is from about 0.6 to about 1.2 and followed by contacting the remaining monomer with an aluminum-vanadium catalyst wherein the mole ratio of aluminum/vanadium is from about 3.0 to about 10.0.

This two-step polymerization system consists of polymerizing a portion of the monomer with a catalyst capable of producing a polymer containing a high cis-1,4 structure and subsequently forming a polymer having a high trans-1,4 structure with the remaining portion of the monomer. The resulting mixture has very high green strength. It may be used as such, or blended with conventional polydienes to provide a blend with high green strength.

An advantage of the two-step polymerization is that the cis-oriented polymer and trans-oriented polymer do not have to be prepared in separate reaction vessels, and then mixed in cement form or as a dry mix. This would be a costly operation which is eliminated by the teachings of the present invention.

There are a variety of known catalysts which will polymerize monomers such as isoprene and 2-ethyl butadiene to a polymer structure which contains a high proportion of the polymer in a cis-1,4 configuration. A particularly effective class of catalysts which will direct the polymerization of alkyl substituted butadiene monomers to form a polymer containing a high percentage of cis-1,4 structure is the class of catalysts based on a mixture of an organo-metallic reducing agent and a transition metal salt. For instance, it is known that isoprene can be polymerized to cis-1,4-polyisoprene by means of a catalyst comprising a mixture of an organoaluminum compound such as a trialkyl aluminum in combination with a transition metal compound such as titanium tetrachloride. Also, a catalyst which will direct isoprene to a high cis-1,4-polyisoprene is a catalyst which is a mixture of an alkyl aluminum etherate in combination with titanium tetrachloride. Thus, the catalysts which will polymerize isoprene or 2-ethyl butadiene into polymers containing a high proportion, i.e. 90 percent or more, of the monomer segments to a cis-1,4 structure are well known to those skilled in the art.

The class of catalysts which will produce a high percentage of cis-1,4 structure from isoprene or 2-ethyl butadiene based on a mixture of organoaluminum compounds, such as trialkyl aluminum or trialkyl aluminum etherate and a transition metal compound such as titanium tetrachloride require that the ratio of the organo-aluminum compound (Al) to the titanium tetrachloride (Ti) must be controlled rather stringently. For instance, it is known that such catalysts should be employed in the range to give an Al/Ti mole ratio of from about 0.6/1 to about 1.2/1.

The trans-producing catalysts used in this invention are based on the use of an organoaluminum compound in mixture with a different transition metal compound such as vanadium halides, as for example, vanadium trichloride. The mole ratio of the organoaluminum compound such as trialkyl aluminum (Al) to the vanadium trichloride (V) should be maintained in a mole ratio of Al/V of about 3/1 to about 10/1.

If one utilized the alkyl aluminum or alkyl aluminum etherate/titanium tetrachloride system to produce the cis portion, which requires rather tight control of the Al/Ti mole ratio, one, if desired, could add the vanadium trichloride to the process initially along with the proper amount of alkyl aluminum or alkyl aluminum etherate and the titanium tetrachloride and when the desired amount of cis polymer has been formed, additional amounts of alkyl aluminum or alkyl aluminum etherate could be added to give an Al/V mole ratio of between 3/1 and 10/1 to form the trans portion of the polymer. This is not to say, however, that if a catalyst based on Al/Ti were employed to form the cis portion, that the trans catalyst based on Al/V could not be subsequently added.

The preferred catalyst system to form the cis portion of the polyisoprene or the poly(ethyl butadiene) in this invention is the catalyst based on a trialkyl aluminum compound and titanium tetrachloride. Representative examples of trialkyl aluminum compounds are triethylaluminum, tri-n-propylaluminum, triisobutylaluminum, and the like. Representative of the trialkyl aluminum etherate useful in this invention are such compounds as prepared from the aforementioned trialkyl aluminum compounds reacted with about 0.5 to about 1.0 molar quantities of ethers. Representative of suitable ethers are dibutyl ether, diamyl ether, dihexyl ether and other dialkyl ethers. Suitable aromatic ethers are diphenyl ether, anisole and phenetole.

In the trans-producing catalyst the same organoaluminum compounds useful in the cis-producing catalysts are usually employed; the difference being that a different transition metal, a vanadium halide such as vanadium trichloride, vanadium tetrachloride, or vanadium oxychloride is employed and the mole ratios of Al/V are different than those employed with the titanium tetrachloride and the organoaluminum compound.

One of the features of this invention which makes it unique is that the resulting polymers made by this process are mixtures of cis-1,4 oriented homopolymers and trans-1,4 oriented homopolymers rather than what is known as "stereo-block" polymers. Stereo-block polymers are featured by the oppositely oriented structure of the polymer being chemically connected by a bond to the polymer chain. In this invention, the polymeric end product is predominantly characterized by two separately characterized homopolymers mixed intimately together to give the desired excellent green strength in the unvulcanized gums and unvulcanized compounded stocks.

Table A illustrates some of the data supporting the fact that the polymers are mixtures of homopolymers rather than stereo-blocks. Three polymers were extensively extracted with refluxing pentane (pentane is a poor solvent for trans-1,4-polyisoprene at reflux temperature). The first (1) polymer was a physical blend of cis-1,4-polyisoprene and trans-1,4-polyisoprene having a composition of 49 percent and 51 percent respectively. The second (2) polymer was prepared by the process used in this invention and had a composition of 54 percent cis-1,4 oriented isoprene units and 46 percent trans-1,4 oriented isoprene units. The third (3) polymer was prepared by the process used in this invention and had a composition of 53 percent cis-1,4 oriented isoprene units and 47 percent trans-1,4 oriented isoprene units. If the polymers prepared by the process utilized in this invention are predominately homopolymers, then they should be fractionated in a similar manner as the first (1) physically blended polymers. The data indicates this to be a fact.

TABLE A

| | Pentane Soluble Portion (~50% of Sample) | |
|---|---|---|
| | % Cis Polymer (Wt %) | % Trans Polymer (Wt %) |
| (1) | 72 | 28 |
| (2) | 78 | 22 |
| (3) | 93 | 7 |

| | Pentane Insoluble Portion (~50% of Sample) | |
|---|---|---|
| | % Cis Polymer (Wt %) | % Trans Polymer (Wt %) |
| (1) | 32 | 68 |
| (2) | 27 | 73 |
| (3) | 30 | 70 |

This extraction data clearly indicates that the polymers made by the process of this invention are mixtures of cis and trans homopolymers, for if they were stereo-block polymers, little or no fractionation would have been possible. The Pentane insoluble portion of the stereo-block polymer would have lowered the solubility of the total polymer and made it different from the first (1) physically blended polymer (from which should be extracted predominately cis polymer and leave mainly trans polymer in the pentane insoluble portion). Thus, the similar fractionation results for the physically blended polymer and the products made by the process of this invention clearly show that mixtures rather than stereo-block polymers have been produced.

The polymerization is carried out in general at temperatures from −10°C. to 100°C., preferably between 20°C. and 80°C.

While bulk polymerizations can be conducted, in general, the polymerizations of this invention are carried out in any inert solvent, and are, thus, solution polymerizations. Such solvents are usually aliphatic, aromatic or cycloaliphatic hydrocarbons, examples of which are pentane, hexane, toluene, benzene, cyclohexane and the like. Also, continuous and batch polymerization techniques may be utilized in the practice of this invention.

It is necessary to conduct the polymerizations of this invention employing the conventional air-free and moisture-free techniques.

The practice of this invention is further illustrated by reference to the following examples which are intended to be representative rather than restrictive of the scope of the invention.

EXAMPLE I

To each of two bottles containing 10 grams isoprene and 40 grams pentane was added 0.40 milliliters of 0.3 molar slurry vanadium trichloride in heptane followed by 0.30 milliliters of a 0.9 triisobutyl aluminum.phenyl ether/titanium tetrachloride (TIBA.0$\phi_2$/TiCl$_4$) catalyst (0.35 molar in titanium). After 15 minutes, 0.64 milliliters of bulk triisobutylaluminum (TIBA) was added to each bottle. Data on the two samples are shown in the following table:

| Polymerization Time (After TIBA addition) | Conversion | Cis-1,4 | Trans-1,4 (I.R.) |
|---|---|---|---|
| 4 hours | 63% | 98% | 0% |
| 22 hours | 79% | 77% | 23% |

EXAMPLE II

To a premix containing 19,300 grams 20.0 weight percent isoprene in pentane was added 14 mls. of 1.0 triisobutyl aluminum phenyl ether/titanium tetrachloride (TIBA.0$\phi_2$/TiCl$_4$) catalyst (0.344 molar in titanium). After a polymerization time of 3 hours at 30°C. a solids determination indicated about 45% conversion. At this time was added 250 mls. of 0.40 triethylaluminum/vanadium tetrachloride plus titanium tetrachloride (0.20 molar in vanadium; V/Ti = 1) catalyst followed by 37 grams triethyl aluminum. After an additional 13½ hour polymerization time, 80% conversion had been attained and the polymerization was stopped. Nuclear magnetic resonance (NMR) analysis showed the above prepared material to be 57% cis-1,4 and 43% trans-1,4 polyisoprene. The dried rubber was very stiff and tough. Green strength evaluations were made in the following manner. Rubber samples were pressed at 270°F. for 15 minutes, cut into one-eighth inch dumbbells and pulled at 10 inches/minute at room temperature. Instron data are as follows:

|  | Unmilled | | Milled 5 minutes[1] | |
|---|---|---|---|---|
|  | Ultimate Tensile | % Elongation | Ultimate Tensile | % Elongation |
| Natsyn 200 | 45 psi | 800 | (Too weak to pull) | |
| Sample of Example II (Typical) | 250 psi | 100 | 515 psi | 450 |
| Natural rubber | 80 psi | 400 | 25–50 psi | 500 |

[1] 10 gram samples milled on a small open laboratory mill at 100–125°F. Both samples milled and banded normally.

EXAMPLE III

To a premix consisting of 24,430 grams 14.9 weight percent isoprene in benzene was added 3.2 mls. of 1.0 molar triisobutylaluminum followed by 8.31 grams of vanadium chloride ($VCl_3$) as a slurry in benzene. Then 130 mls. of 1.0 molar triisobutyl.phenyl ether/titanium tetrachloride catalyst (0.33 molar in titanium) was added for the cis-1,4 polymerization step. After 2.5 hours, 48.5 grams of triethylaluminum (TEAL) dissolved in 60 mls. of benzene was added. After 4 more hours the polymerization was terminated by addition of a shortstopping agent. The polymer was isolated and dried. The percent conversion was 75 percent and the polymer had a cis-1,4 structure of 80 percent and a trans-1,4 structure of 20 percent as determined by nuclear magnetic resonance (NMR). The isolated polymer had the same toughness and high strength as shown by the sample of the previous example. It was then used to prepare blends with Natsyn-200 (a Goodyear cis-1,4 polyisoprene) and these blends tested for green strength in the following manner: the control (Natsyn-200) and the mixtures were masticated in a Brabender Plastograph at 225°F. for 8 minutes at 50 revolutions per minute (rpm). Green strength measurements were made as described in Example II. Instron data are below:

|  | Yield pt. (psi)[1] | Ultimate Tensile (psi) | Elongation % |
|---|---|---|---|
| Natsyn 200 | 25 | 10 | 2500 |
| 13.5 gms. polymer + 40.5 gms. Natsyn 200 | 36 | 45 | 1700 |
| 27.0 gms. polymer + 27.0 gms. Natsyn 200 | 48 | 88 | 1000 |

[1] Yield point - that point at which the tensile momentarily decreases.

It has been found that from about 2.5 percent to about 15 percent of the trans-1,4 configuration by weight in the polymer blends will provide an increase in the final green strength so that the polymer blend can be handled without the tendency to rupture.

While certain representative embodiments and details have been shown for the purpose of illustrating the invention, it will be apparent to those skilled in this art that various changes and modifications may be made therein without departing from the spirit or scope of the invention.

What is claimed is:

1. A process for preparing a mixture of high cis-1,4 configuration polymer and high trans-1,4 configuration polymer comprising the steps of contacting monomers conforming to the structural formula

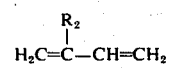

wherein $R_1$ may be an alkyl group containing from 1 to 2 carbon atoms, with a catalyst based on an organoaluminum compound with titanium tetrachloride to produce a desired amount of high cis-1,4 configuration polymer and subsequently adding, in the presence of the cis producing catalyst, a catalyst based on organoaluminum compounds with compounds selected from the group consisting of vanadium trichloride, vanadium tetrachloride and vanadium oxychloride to form a high trans-1,4 configuration polymer wherein the mole ratio of the aluminum/titanium in the cis producing catalyst is from about 0.6 to about 1.2 and the mole ratio of the aluminum/vanadium in the trans producing catalyst is from about 3.0 to about 10.0.

2. A process according to claim 1 in which the organo-aluminum compound used to form the cis-1,4 polymer is selected from the group of trialkyl aluminums and trialkyl aluminum etherates.

* * * * *